United States Patent Office 2,989,407
Patented June 20, 1961

2,989,407
BLACK ANTIFOULING BOOTTOPPING PAINT
William J. Francis, Portsmouth, Va.
No Drawing. Filed July 14, 1954, Ser. No. 443,443
12 Claims. (Cl. 106—17)
(Granted under Title 35, U.S. Code (1952), sec. 266)

The invention described herein may be manufactured and used by or for the Government of the United States of America for governmental purposes without the payment of any royalties thereon or therefor.

The present invention relates to coating materials; and more particularly relates to an antifouling paint or coating composition suitable for protecting metal surfaces against marine fouling and against other detrimental effects of exposure to sea water and air; and specifically relates to improvements in black boottopping paints for ships, submarines, etc.

Boottopping coatings, or paints, are generally used to coat the bottoms of hulls of submarines and the boottopping areas of surface vessels; the boottopping area being that area of the exposed hull from the light-load line to the maximum load line at which a vessel is expected to operate. The paint is preferably black, the black color being desirable on a submarine for purposes of camouflage and concealment, and on surface vessels for maintaining a trim appearance.

A principal object of the invention is to provide an improved black antifouling paint or protective coating of extensive applicability for protecting metal surfaces subjected to severe exposure conditions, such surfaces being, for example, the water-line areas of vessels and the underwater hull surfaces of ships and submarines.

An important object of the invention is to provide a boottopping protective coating or paint that has excellent film integrity and durability for preventing corrosion of water-line metal surfaces.

A further object of the invention is to provide a boottopping paint that serves as a highly protective barrier against corrosion and marine fouling of surfaces subjected to alternate sea-water and air exposure, as in the case of water-line areas of surface vessels.

Still another object of the invention is to provide a boottopping paint that has excellent film integrity and durability, and that has toughness and flexibility of film to withstand the effects of exposure to water and air and the effects of abrasion due to floating debris hitting the vessel's water-line surfaces.

A boottopping paint in accordance with the invention is not thixotropic; has excellent can stability; requires only a minimum amount of stirring for proper application; can be easily applied by brushing, spraying or roller coating; dries rapidly after application and gives a hard water-resistant film; has less tendency than prior paints to fail in service by blistering, cracking and loss of adhesion; and retains its black color and antifouling properties for exceptionally long periods of time.

Another objective of the invention is to provide a black oleo-resinous paint that dries quickly without the use of metallic soap driers in the formulation.

An important object of the invention is to provide a paint of the nature described which can easily be made with common raw materials readily available domestically.

Other objects and many attendant advantages and features of the invention will be apparent from the following description of embodiments thereof.

In general, a coating may be considered to be made of ingredients classified in accordance with the pattern outlined in column 3 of U.S. Patent No. 2,579,610, dated December 25, 1951, granted to Antonio S. Pitre.

In general, a paint in accordance with the invention is based on rosin plasticized with blown fish oil as the matrix for the pigment ingredients, which forms a film of a controlled soluble matrix type that permits the gradual dissolution of the matrix in sea water at a rate suitable for concurrent release of the toxic particles in the pigment, thus resulting in effective antifouling action.

A coating or paint in accordance with the invention is, specifically, a black liquid paint composition based on a rosin and blown fish-oil vehicle containing a volatile organic solvent, such as coal tar naptha, and pigmented with inorganic toxic copper and mercuric compounds, a metallic soap as a dispersion agent and anti-settling agent, a black coloring pigment, and an inert extender.

The quantities or percentages by weight of the component ingredients of a black boottopping coating composition embodying the invention are as follows:

| Ingredient | Percent Range | Percent Preferred |
|---|---|---|
| Rosin | 20.23 to 28.86 | 23.40 |
| Blown fish oil | 7.97 to 13.26 | 10.02 |
| Zinc stearate | 0.85 to 2.45 | 1.67 |
| Cuprous oxide | 27.78 to 34.60 | 28.40 |
| Magnesium silicate | 2.21 to 6.64 | 4.68 |
| Mercuric oxide | 0.88 to 5.27 | 3.68 |
| Lampblack | 4.34 to 10.33 | 5.85 |
| Coal tar naphtha | 16.72 to 25.07 | 22.30 |

Cuprous sulfide or copper pigment (containing a minimum of six percent cuprous oxide) may be substituted for the cuprous oxide.

Diatomaceous silica or other silica extender pigment may be used in place of magnesium silicate.

Carbon black and black iron oxide may be used as alternate blackening pigments instead of lampblack.

From the above table, it is evident that the ratio of rosin to blown fish oil can be as low as about 1.5 and as high as about 3.6, by weight.

A manner of preparing the coating can be understood from the following description for making about one hundred gallons from the ingredients listed in the following table:

| Ingredient | Gov't Specification | Lbs. |
|---|---|---|
| Rosin (gum or wood) | LLL-R-626, dated 3/11/42 | 280 |
| Blown fish oil | "Falkovar A" or equal of approximately the following characteristics:<br><br>Specific gravity at 60° F.—0.990–1.015<br>Iodine number—90–105<br>Free fatty acids (as oleic)—7% (maximum)<br>Saponification number—190 (minimum)<br>Color (Gardner standards)—12–14<br>Viscosity, Saybolt at 210° F.—980–1,020 | 120 |
| Coal tar naphtha | MIL-N-15178, dated 6/1/50 | 267 |
| Zinc stearate | (Technical grade) | 20 |
| Cuprous oxide | MIL-C-15169, dated 6/1/50 | 340 |
| Mercuric oxide | MIL-M-15177, dated 3/26/52 | 44 |
| Magnesium silicate | MIL-M-15173, dated 7/1/50 | 56 |
| Lampblack | TT-L-70, dated 5/17/44 | 70 |

The rosin and fish oil are heated together in a kettle to 300° F. until entirely liquid. The batch is then removed from the heat and the batch stirred while the coal tar naphtha is slowly added thereto. The batch constituting the mixed vehicle is then allowed to cool to ordinary room temperature. It is in liquid form at such temperatures. A paste is then formed by adding the dry ingredients, comprising the pigments, to about 636 pounds of the mixed vehicle to form a paste of suitable consistency for grinding. The paste is then ground on a roller mill or other suitable mill to obtain uniform dispersion and to obtain a minimum fineness of grind of 4 Hegeman gauge. The ground paint base is then thinned with the remainder of the mixed vehicle, and this batch thoroughly mixed to give a homogeneous liquid paint. This paint can be placed in any suitable receptacles, preferably metal cans, for storage.

The new paint is fluid and not thixotropic at ordinary temperatures so that little stirring is required prior to application by any of the common means, viz: brushing, spraying, and by roller. The paint dries rapidly after application, being dry to touch in about ten minutes and dried hard in about one and one-half to three and one-half hours. The paint dries rapidly apparently because of its mercuric oxide ingredient which also functions as a toxic antifouling agent and also as a toughening agent for the film by partially reacting with the vehicle binder comprising the rosin, the blown fish oil, and the coal tar naphtha. Black antifouling paints in accordance with prior art, such as Navy Formulas Nos. 3, 145 and 146, are slow drying.

The new paint retains its antifouling properties for considerable length of time. Tests have shown that the paint gives excellent film durability and provides protection against corrosion and against marine fouling organisms, such as algae and hydroids that attach to water-line surfaces of vessels, as well as shell fouling matter like barnacles, tubeworms and encrusting bryzoa that foul shipbottoms. Steel panels painted with two coats of the new paint were tested under sea-immersion conditions and had satisfactory performance after twenty-three months, over three times as long as other black boottopping paints.

The new antifouling paint retains its black color during long periods of service, whereas others become green after exposure to sea water. It has previously been most difficult to make a black paint with good fouling-resistance properties. An article on "Nature and Extent of Fouling of Ships' Bottoms," by J. Paul Visscher, in the Department of Commerce Bulletin 1031, dated 1928, reports that black-colored surfaces are most susceptible to marine fouling as compared with light-colored surfaces.

The new paint has excellent can stability under variable storage conditions for several years without significant thickening, curdling or gelling, hard settling of the pigment, skinning in the container, or corrosive attack on the container surface.

The new paint, based on rosin plasticized with blown fish oil as the matrix for the pigment ingredients, forms a film of a controlled soluble matrix type that permits the gradual dissolution of the matrix in sea water at a rate suitable for the concurrent release of the toxic particles in the pigment, thus resulting in effective antifouling action.

It is therefore to be noted that an improved black antifouling paint or coating has been provided for boottopping purposes that has the advantages and characteristics disclosed in the foregoing.

Obviously many modifications and variations of the present invention are possible in the light of the above teachings. It is therefore to be understood that within the scope of the appended claims the invention may be practiced otherwise than as specifically described:

What is claimed is:

1. A marine paint comprising a vehicle and a pigment, said vehicle consisting essentially of:

| | Percent |
|---|---|
| Rosin | 20.23–28.86 |
| Blown fish oil | 7.97–13.26 |
| Solvent | 16.72–25.07 | and said pigment comprising a mercuric oxide containing material in which the mercuric oxide is present in an amount of .88–5.27%, all percentages being of the weight of the paint.

2. A marine paint comprising a vehicle and a pigment, said vehicle consisting essentially of:

| | Percent |
|---|---|
| Rosin | 20.23–28.86 |
| Blown fish oil | 7.97–13.26 |
| Solvent | 16.72–25.07 | said pigment consisting essentially of:

| | Percent |
|---|---|
| An anti-fouling copper-containing compound | 27.78–34.60 |
| Mercuric oxide | .88–5.27 | percentages being of the weight of the paint.

3. A marine paint as defined in claim 2 wherein said solvent is coal tar naphtha.

4. A marine paint as defined in claim 2 but further characterized by comprising 4.34–10.33% of a blackening agent.

5. A marine paint as defined in claim 4 wherein said blackening agent is selected from the group consisting of carbon black, black iron oxide, and lampblack.

6. A black boottopping paint comprising

| Ingredient: | Percent range by weight |
|---|---|
| Rosin | 20.23–28.86 |
| Blown fish oil | 7.97–13.26 |
| An anti-settling agent | 0.85–2.45 |
| Toxic copper compound | 27.78–34.60 |
| Inert extender pigment | 2.21–6.64 |
| Mercuric oxide | 0.88–5.27 |
| Coloring agent | 4.34–10.33 |
| Solvent | 16.72–25.07 |

7. A paint as defined in claim 6 wherein said coloring agent is selected from the group consisting of carbon black, black iron oxide and lampblack.

8. A paint as defined in claim 7 wherein said solvent is coal tar naphtha.

9. A method of preparing a black boottopping paint having an ultimate composition consisting essentially of:

| Ingredient: | Percent range by weight |
|---|---|
| Rosin | 20.23–28.86 |
| Blown fish oil | 7.97–13.26 |
| An anti-settling agent | 0.85–2.45 |
| Toxic copper compound | 27.78–34.60 |
| Inert extender pigment | 2.21–6.64 |
| Mercuric oxide | 0.88–5.27 |
| Coloring agent | 4.34–10.33 |
| Solvent | 16.72–25.07 | which comprises heating the rosin and blown fish oil together to 300° F. until entirely liquid, adding the solvent while the liquid is stirred, cooling the resulting batch, and mixing the remaining ingredients into the batch.

10. A black boottopping paint comprising

| Ingredient: | Percent range by weight |
|---|---|
| Rosin | 20.23 to 28.86 |
| Blown fish oil | 7.97 to 13.26 |
| Zinc stearate | 0.85 to 2.45 |
| Cuprous oxide | 27.78 to 34.60 |
| Magnesium silicate | 2.21 to 6.64 |
| Mercuric oxide | 0.88 to 6.64 |
| Lampblack | 4.34 to 10.33 |
| Coal tar naphtha | 16.72 to 25.07 |

11. A black boottopping paint comprising

| Ingredient: | Preferred percent by weight |
|---|---|
| Rosin | 23.40 |
| Blown fish oil | 10.02 |
| Zinc stearate | 1.67 |
| Cuprous oxide | 28.40 |
| Magnesium silicate | 4.68 |
| Mercuric oxide | 3.68 |
| Lampblack | 5.85 |
| Coal tar naphtha | 22.30 |

12. A method of preparing a black boottopping paint having an ultimate composition by weight of:

| | Percent |
|---|---|
| Rosin | 20.23–28.86 |
| Blown fish oil | 7.97–13.26 |
| Coal tar naphtha | 16.72–25.07 |
| Zinc stearate | .85–2.45 |
| Copper pigment | 27.78–34.60 |
| Mercury pigment | .88–5.27 |
| Silicon-containing pigment | 2.21–6.64 |
| Blackening agent | 4.34–10.33 | which comprises heating the rosin and blown fish oil together to 300° F. until entirely liquid, adding the coal tar naphtha while the liquid is stirred, cooling the resulting batch, and mixing the remaining ingredients into the batch.

References Cited in the file of this patent

UNITED STATES PATENTS

| | | |
|---|---|---|
| 1,072,485 | Moran et al. | Sept. 9, 1913 |
| 1,956,442 | Hathaway | Apr. 24, 1934 |
| 1,963,105 | Swift | June 19, 1934 |
| 2,136,681 | Fulton et al. | Nov. 15, 1938 |
| 2,427,082 | Zurcher | Sept. 9, 1947 |
| 2,579,610 | Pitre | Dec. 25, 1951 |
| 2,738,283 | Furness | Mar. 13, 1956 |

FOREIGN PATENTS

| | | |
|---|---|---|
| 495,364 | Canada | Aug. 18, 1953 |

OTHER REFERENCES

Chemistry of Paints, Pigments, Varnishes—Bearn (1924), published by Van Nostrand.

Stewart: National Paint Dictionary, 3rd edition, 1938, pages 89–90.

Chatfield: Varnish Constituents, Interscience Publishers, Inc., 1944, pages 22–24.